US009723386B1

(12) United States Patent
Ni et al.

(10) Patent No.: US 9,723,386 B1
(45) Date of Patent: Aug. 1, 2017

(54) COMMUNICATION DEVICE

(71) Applicant: Google Inc., Mountain View, CA (US)

(72) Inventors: Melvin Sze-ming Ni, Cupertino, CA (US); Chiachi Wang, Union City, CA (US)

(73) Assignee: Google Inc., Mountain View, CA (US)

( * ) Notice: Subject to any disclaimer, the term of this patent is extended or adjusted under 35 U.S.C. 154(b) by 545 days.

(21) Appl. No.: 14/269,385

(22) Filed: May 5, 2014

(51) Int. Cl.
  *H04B 10/00* (2013.01)
  *H04Q 11/00* (2006.01)
  *H04B 10/112* (2013.01)

(52) U.S. Cl.
  CPC ..... *H04Q 11/0005* (2013.01); *H04B 10/1129* (2013.01); *H04Q 11/0066* (2013.01); *H04Q 2011/0016* (2013.01); *H04Q 2011/0026* (2013.01)

(58) Field of Classification Search
  CPC .......................... H04B 10/118; H04B 10/1125
  USPC ................................................. 398/118–131
  See application file for complete search history.

(56) References Cited

U.S. PATENT DOCUMENTS

| | | | | |
|---|---|---|---|---|
| 5,517,016 A | * | 5/1996 | Lesh | H04B 10/118 250/201.1 |
| 5,627,669 A | * | 5/1997 | Orino | H04B 10/118 398/129 |
| 5,689,354 A | * | 11/1997 | Orino | H04B 10/1125 398/129 |
| 6,075,635 A | * | 6/2000 | Butrie | G02B 6/4246 385/24 |
| 6,304,354 B2 | * | 10/2001 | Carlson | H04B 10/118 398/122 |
| 6,449,076 B1 | * | 9/2002 | Loveridge | H04B 10/118 398/121 |
| 6,577,421 B1 | * | 6/2003 | Cheng | H04B 10/1125 398/129 |
| 6,778,886 B2 | | 8/2004 | Hunt | |
| 6,925,256 B1 | * | 8/2005 | Heiney | H04B 10/1125 398/135 |
| 7,260,330 B2 | | 8/2007 | Chew et al. | |

(Continued)

FOREIGN PATENT DOCUMENTS

WO   WO-0128137 A1   4/2001
WO   WO-2014025426 A2   2/2014

*Primary Examiner* — Ken N Vanderpuye
*Assistant Examiner* — Amritbir Sandhu
(74) *Attorney, Agent, or Firm* — Honigman Miller Schwartz and Cohn LLP

(57) ABSTRACT

A communication system includes a transparent refractive optical wedge, a steerable mirror, a position feedback device, and a transceiver. The transparent refractive optical wedge has first and second faces angled with respect to each other and receives first and second optical signals through both the first and second faces. The first and second optical signals travel along parallel or common paths through the first face and diverge at a deflection angle with respect to each other through the second face. The steerable mirror is in optical communication with the first face of the optical wedge, the position feedback device, and the transceiver. The position feedback device adjusts a position of the steerable mirror to maintain the alignment of the reflected signal with the position feedback device. The transceiver has an optical transmitter transmitting one of the optical signals and an optical receiver receiving the other optical signal.

30 Claims, 13 Drawing Sheets

(56) References Cited

U.S. PATENT DOCUMENTS

| | | | | |
|---|---|---|---|---|
| 7,920,794 B1* | 4/2011 | Whaley | H04B 10/1125 | 398/122 |
| 8,817,096 B1* | 8/2014 | Ni | G01S 17/89 | 348/144 |
| 2001/0043380 A1* | 11/2001 | Ohtsubo | H04B 10/1125 | 398/118 |
| 2002/0105984 A1* | 8/2002 | Yamamoto | H01S 5/4068 | 372/44.011 |
| 2003/0035182 A1* | 2/2003 | Sidorovich | H04B 10/1149 | 398/126 |
| 2003/0044636 A1* | 3/2003 | Sakanaka | G02B 26/0816 | 428/647 |
| 2004/0151504 A1* | 8/2004 | Triebes | H04B 10/1125 | 398/131 |
| 2004/0202415 A1* | 10/2004 | Ohmuro | H04B 10/1125 | 385/24 |
| 2004/0202482 A1* | 10/2004 | Usui | H04B 10/1125 | 398/156 |
| 2005/0018967 A1* | 1/2005 | Huang | G02B 6/2746 | 385/39 |
| 2005/0100339 A1* | 5/2005 | Tegge | H04B 10/118 | 398/125 |
| 2005/0129406 A1* | 6/2005 | Shigeta | H04B 10/118 | 398/118 |
| 2005/0141897 A1* | 6/2005 | Takahashi | H04B 10/1125 | 398/118 |
| 2006/0008238 A1* | 1/2006 | Suzuki | H04B 10/118 | 385/147 |
| 2006/0018661 A1* | 1/2006 | Green | H04B 10/1127 | 398/128 |
| 2006/0202115 A1* | 9/2006 | Lizotte | B23K 26/04 | 250/234 |
| 2007/0031149 A1* | 2/2007 | Sasai | H04B 10/118 | 398/119 |
| 2007/0031150 A1* | 2/2007 | Fisher | H04B 10/118 | 398/128 |
| 2007/0036511 A1* | 2/2007 | Lundquist | G01J 3/2803 | 385/147 |
| 2007/0050165 A1* | 3/2007 | Gray | A61B 3/00 | 702/108 |
| 2007/0139749 A1* | 6/2007 | Haney | G02B 6/43 | 398/129 |
| 2010/0226655 A1* | 9/2010 | Kim | G02B 6/4246 | 398/139 |
| 2010/0266294 A1* | 10/2010 | Popp | G02B 6/3604 | 398/200 |
| 2012/0308239 A1* | 12/2012 | Sheth | H04B 10/118 | 398/131 |
| 2013/0336661 A1* | 12/2013 | Chorvalli | H04B 10/516 | 398/119 |
| 2014/0016938 A1* | 1/2014 | Sandstrom | H04B 10/506 | 398/72 |
| 2014/0241731 A1* | 8/2014 | Peach | H04B 10/1127 | 398/128 |
| 2014/0294399 A1* | 10/2014 | Makowski | H04B 10/11 | 398/126 |
| 2015/0125157 A1* | 5/2015 | Chao | H04B 10/118 | 398/122 |
| 2015/0244458 A1* | 8/2015 | Erkmen | H04B 10/1129 | 398/122 |
| 2016/0329961 A1* | 11/2016 | Li | H04B 10/1125 | |
| 2017/0045752 A1* | 2/2017 | Bitauld | G02B 27/283 | |

* cited by examiner

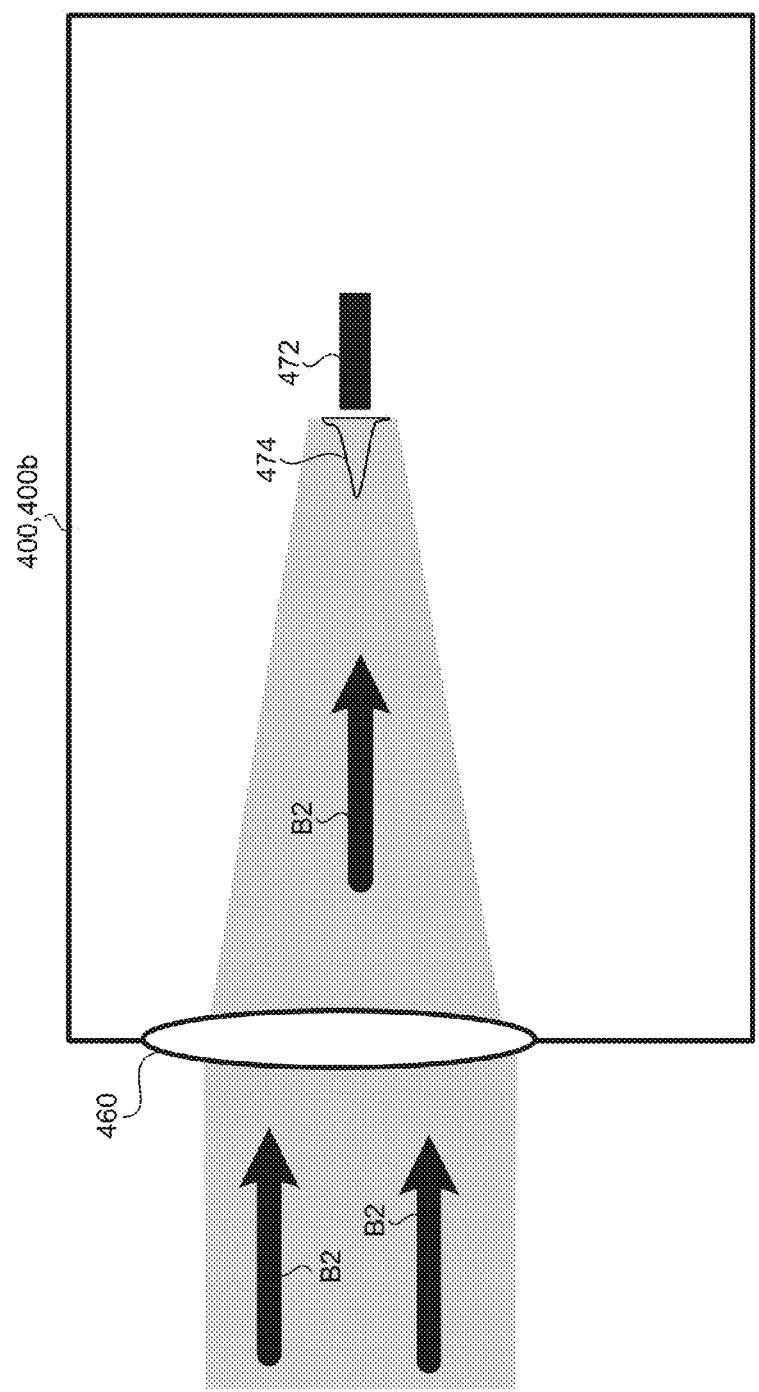

COMMUNICATION DEVICE

TECHNICAL FIELD

This disclosure relates to communication devices.

BACKGROUND

A communication network is a large distributed system for receiving information (e.g., a signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites and high-altitude communication balloons are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. Each satellite may be equipped with communication devices called inter-satellite links (or, more generally, inter-device links) to communicate with other satellites in the same plane or in other planes. The communication devices allow the satellites to communicate with other satellites. These communication devices are expensive and heavy. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

One aspect of the disclosure provides a communication system that includes a transparent refractive optical wedge, a steerable mirror, a position feedback device, and a transceiver. The transparent refractive optical wedge has first and second faces angled with respect to each other and receives first and second optical signals through both the first and second faces. The first and second faces are arranged so that the first and second optical signals travel along parallel or common paths through the first face and diverge at a deflection angle (e.g., between 0 degrees and about 0.1 degrees) with respect to each other through the second face. The steerable mirror is in optical communication with the first face of the optical wedge and the position feedback device (e.g., an image sensor). The position feedback device senses an alignment of one of the signals that reflect off of the steerable mirror with the position feedback device and adjusts a position of the steerable mirror to maintain the alignment of the reflected signal with the position feedback device. The transceiver is in optical communication with the steerable mirror and has an optical transmitter transmitting one of the optical signals and an optical receiver receiving the other optical signal.

Implementations of the disclosure may include one or more of the following features. In some implementations, the optical transmitter transmits the first optical signal and the optical receiver receives the second optical signal. The first and second optical signals travel along a common path between the transceiver and the optical wedge. The optical wedge causes the first optical signal to travel along a first path away from the second face of the optical wedge at the deflection angle with respect to a second path of the second optical signal travelling toward the second face of the optical wedge.

In some examples, the optical wedge includes a fused silica wedge and the first and second faces are angled with respect to each other by an angle of between about 12 degrees and about 16 degrees. Additionally or alternatively, the optical wedge may have an incidence angle on both surfaces of up to about 20 degrees.

The communication system may include a signal splitter in optical communication with the steerable mirror, the position feedback device, and the transceiver. The signal splitter is arranged to split one of the signals travelling from the steerable mirror to the signal splitter. The signal splitter also directs a portion of the split signal to the position feedback device and a remaining portion of the split signal to the transceiver. The communication system may further include an optical lens arranged to focus the portion of the split signal travelling from the signal splitter to the position feedback device. Additionally or alternatively, the communication system may include an optical lens arranged to focus the optical signals travelling between the signal splitter and the transceiver.

The communication system may include an optical fiber in optical communication with the transceiver. The optical lens, which is arranged to focus the optical signals travelling between the signal splitter and the transceiver, directs the optical signals between a tip of the optical fiber and the signal splitter. Moreover, the communication system may include a wavelength division multiplexer optically coupled to the optical fiber and in optical communication with the transceiver.

In some implementations, the communication system further includes a telescope in optical communication with the optical wedge and arranged to focus the signals travelling to and from the second face of the optical wedge. The first and second optical signals may have a wavelength separation of about 20 nm. In some examples, the optical signals received through the optical wedge are collimated.

Another aspect of the disclosure provides a method for communicating. The method includes receiving first and second optical signals through a transparent refractive optical wedge having first and second faces angled with respect to each other. The first and second faces are arranged so that the first and second optical signals travel along parallel or common paths through the first face and diverge at a deflection angle with respect to each other through the second face. The method also includes directing the first and second optical signals along parallel or common paths between a transceiver and the first face of the optical wedge. The transceiver has an optical transmitter that transmits the first optical signal and an optical receiver receiving the second optical signal. In some examples, the optical wedge causes the first optical signal to travel along a first path away from the second face of the optical wedge at the deflection angle with respect to a second path of the second optical signal travelling toward the second face of the optical wedge.

The step of directing the first and second optical signals may include transmitting the first optical signal through an optical fiber optically coupled to the transmitter and to a signal splitter in optical communication with the optical fiber. Moreover, directing the first and second optical signals may also include arranging the signal splitter to direct the first optical signal onto a steerable mirror in optical communication with the signal splitter and the first surface of the optical wedge; and arranging the steerable mirror to direct the first optical signal onto the first face of the optical wedge.

In some implementations, directing the first and second optical signals may include: arranging a steerable mirror to receive the second optical signal through the optical wedge and reflect the second optical signal to a signal splitter in optical communication with the steerable mirror; and arranging the signal splitter to split the second optical signal travelling from the steerable mirror to the signal splitter and direct a portion of the split signal to a position feedback device and a remaining portion of the split signal to the transceiver. The method may also include arranging the signal splitter to direct the remaining portion of the split signal into an optical fiber optically coupled to the transceiver. The method may also include focusing the portion of the split signal that is travelling from the signal splitter to the position feedback device and/or focusing the portion of the split signal travelling from the signal splitter into an optical fiber optically coupled to the transceiver.

The step of directing the first and second optical signals, in some examples, includes adjusting a position of a steerable mirror in optical communication with the first face of the optical wedge to reflect the second optical signal received through the optical wedge onto a position feedback device and sensing, using the position feedback device, an alignment of the reflected second optical signal with the position feedback device. Directing the first and second optical signal may also include adjusting the position of the steerable mirror based on the sensed alignment to maintain the alignment of the second optical signal with the position feedback device. The position feedback device may include an image sensor.

In some examples, the deflection angle equals between 0 degrees and about 0.1 degrees. The optical wedge may include a fused silica wedge and the first and second faces are angled with respect to each other by an angle of between about 12 degrees and about 16 degrees. The optical wedge may have an incidence angle on both surfaces of up to about 20 degrees. In some examples, the method includes arranging a telescope in optical communication with the optical wedge to focus the signals travelling to and from the second face of the optical wedge. The first and second optical signals may have a wavelength separation of about 20 nm. The method may include collimating the optical signals received through the optical wedge.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4C is a schematic view of an exemplary transceiver receiving an optical beam at a fiber tip.

Like reference symbols in the various drawings indicate like elements.

DETAILED DESCRIPTION

Figure 1A:
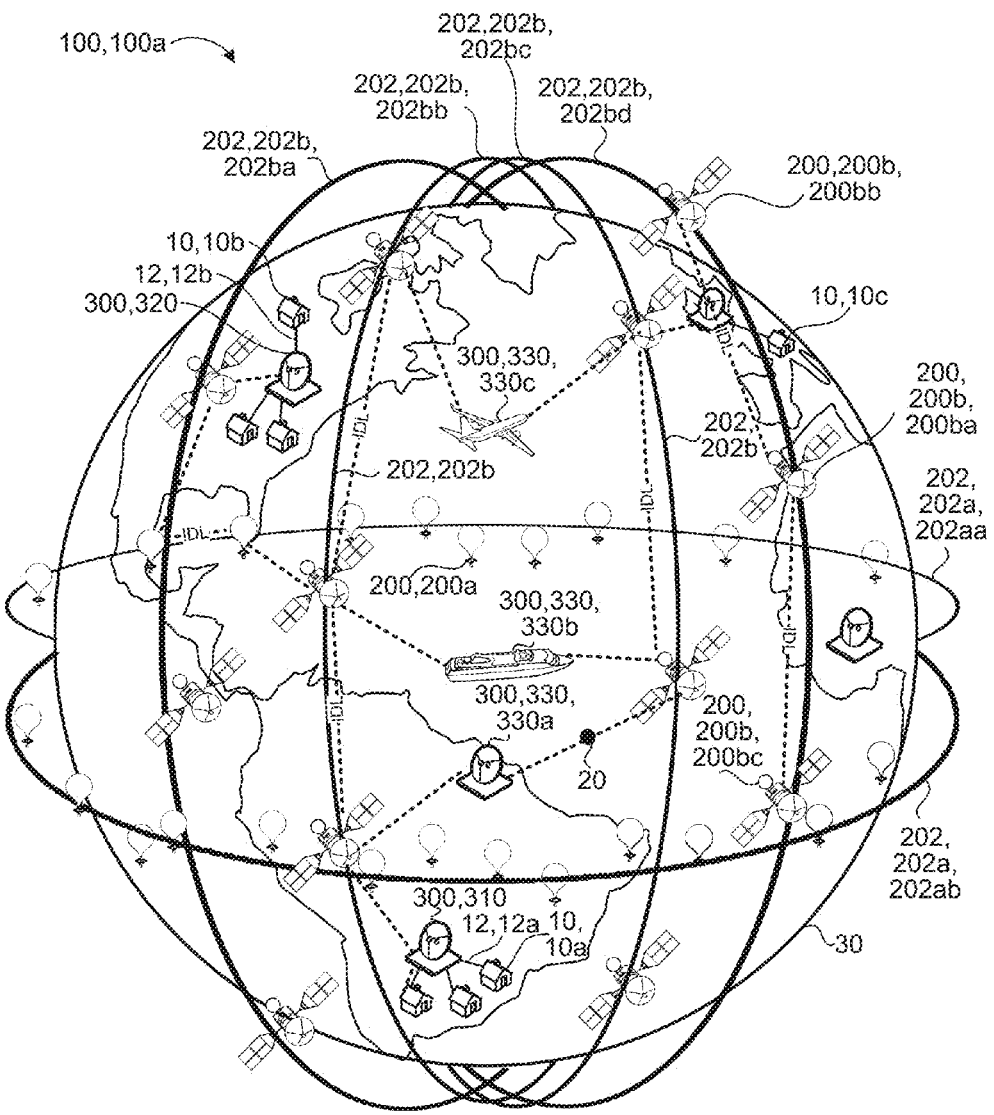
FIG. 1A is schematic view of an exemplary global-scale communication system with satellites and communication balloons, where the satellites form a polar constellation.
Figure 1B:
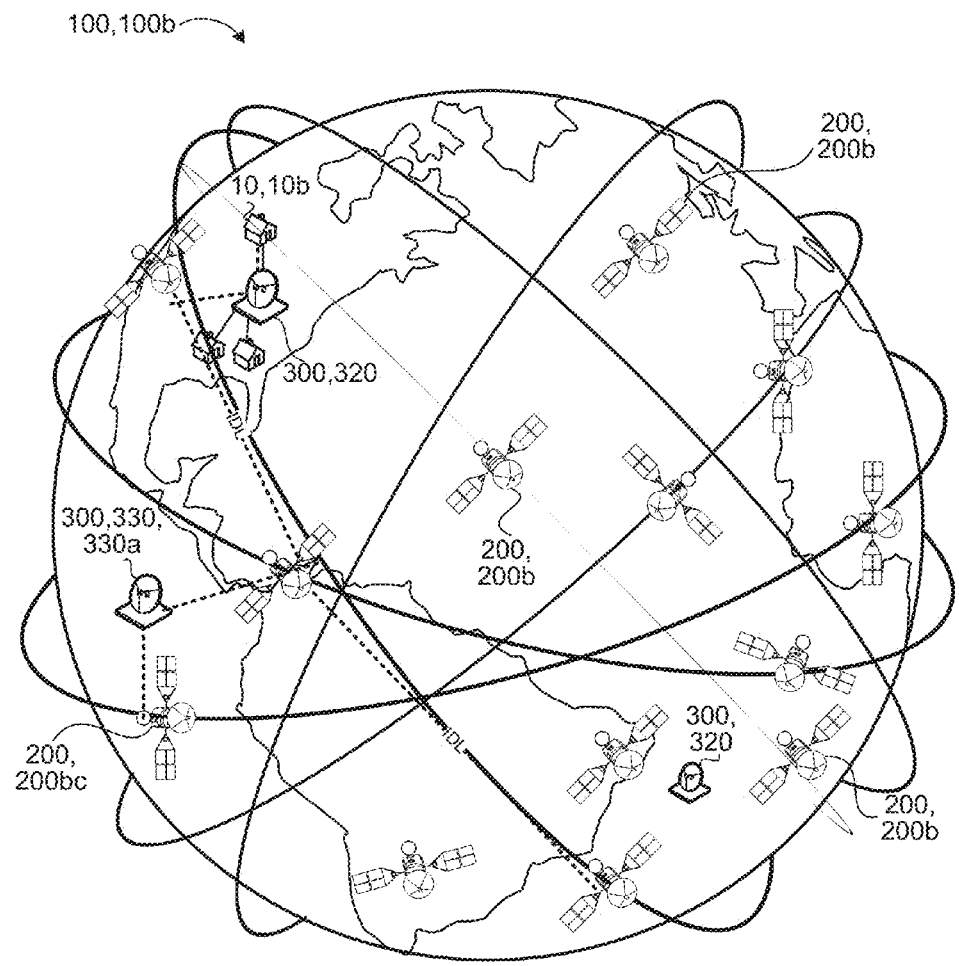
FIG. 1B is a schematic view of an exemplary group of satellites of FIG. 1A forming a Walker constellation.
Figure 1D:
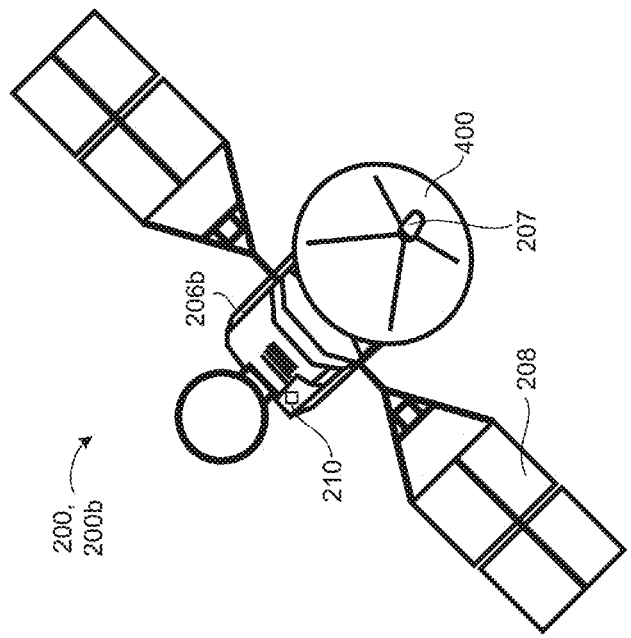
FIG. 1D is a perspective view of an exemplary satellite of the global-scale communication system.
Figure 1C:
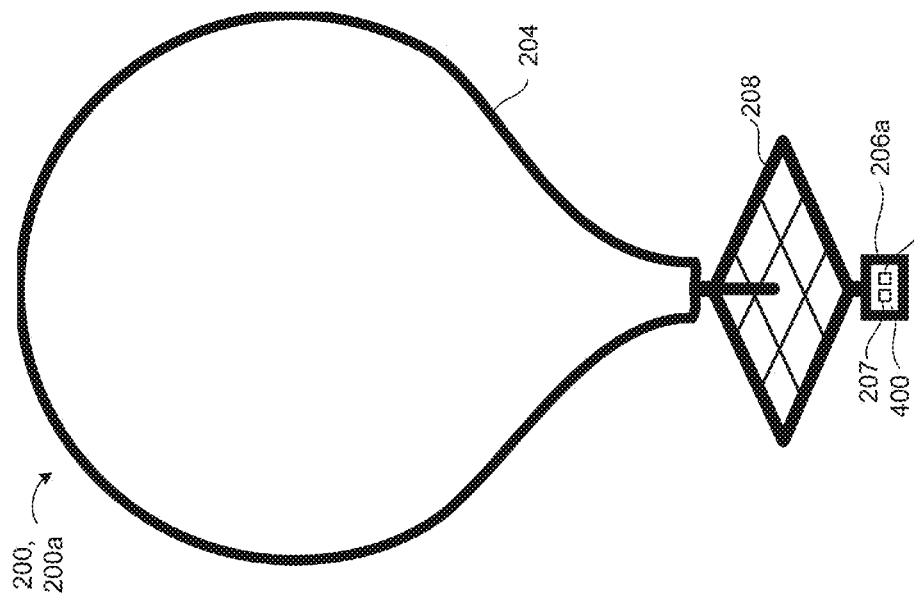
FIG. 1C is a perspective view of an exemplary communication balloon of the global-scale communication system.
Figure 2:
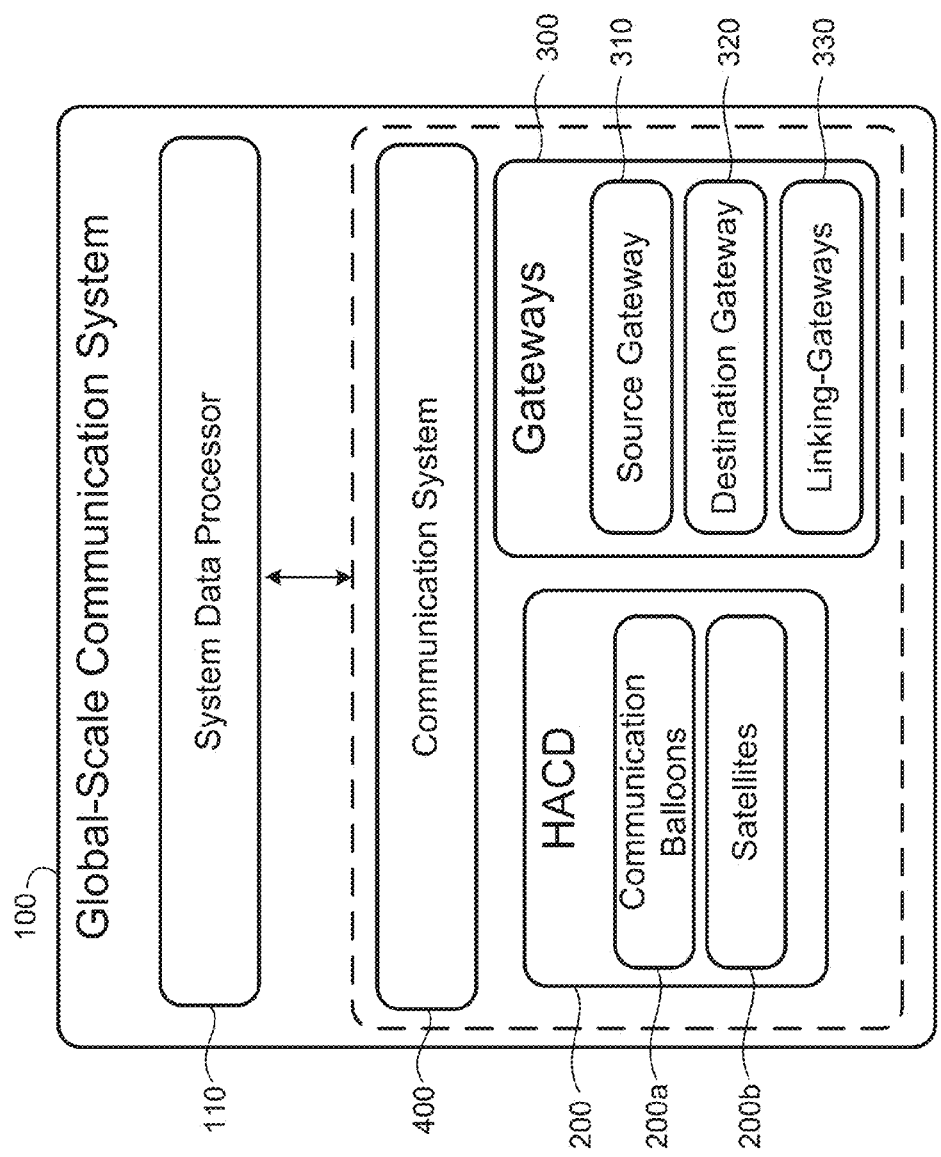
FIG. 2 is a schematic view of an exemplary global-scale communication system.

Referring to FIGS. 1A-2, in some implementations, a global-scale communication system 100 includes High Altitude Communication Devices (HACD) 200, gateways 300 (including source ground stations 310, destination ground stations 320, and linking-gateways 330), and a system data processing device 110. In some examples, the source ground stations 310 and/or the destination ground stations 320 are user terminals or gateways 300 connected to one or more user terminals. An HACD 200 is a device released into the earth's atmosphere. HACD 200 may refer to a communication balloon 200a or a satellite 200b in Low Earth Orbit (LEO) or Medium Earth Orbit (MEO) or High Earth Orbit (HEO), including Geosynchronous Earth Orbit (GEO). The HACD 200 includes an antenna 207 that receives a communication 20 from a source ground station 310 and reroutes the communication signal to a destination ground station 320. The HACD 200 also includes a data processing device 210 that processes the received communication 20 and determines a path of the communication 20 to arrive at the destination ground station 320. The global-scale communication system 100 may include communication balloons 200a, satellites 200b, or a combination of both as shown in FIG. 1A. Additionally, the global-scale communication system 100 includes multiple ground stations 300, such as a source ground station 310, a destination ground station 320, and a linking-gateway 330. The source ground station 310 is in communication with a first user 10a through a cabled, a fiber optic, or a wireless radio-frequency connection 12a, and the destination ground station 320 is in communication with the second user 10b through a cabled, a fiber optic, or a wireless radio-frequency connection 12b. In some examples, the communication between the source ground station 310 and the first user 10a or the communication between the destination ground station 320 and the second user 10b is a wireless communication (either radio-frequency or free-space optical).

The HACDs 200 are divided into groups 202, with each group 202 (also referred to as a plane, since their orbit or trajectory may approximately form a geometric plane) having an orbital path or trajectory different than other groups 202. For example, the balloons 200a as the HACDs 200 rotate approximately along a latitude of the earth 30 (or in a trajectory determined in part by prevailing winds) in a first group or plane 202aa and along a different latitude or trajectory in a second group or plane 202ab. Similarly, the satellites 200b may be divided into a first group or plane 202ba and a second group or plane 202bb. The satellites 200b may be divided into a larger or smaller number of groups 202b. The data processing device 110 may be any one of the data processing devices 210 of the HACDs 200, the data processing device 110 of any of the gateways 300, another data processing device in communication with the HACDs 200 and gateways 300, or a combination thereof.

The first user 10a may communicate with the second user in 10b or a third user 10c. Since each user 10 is in a different location separated by an ocean or large distances, a communication 20 is transmitted from the first user 10a through the global-scale communication system 100 to reach its final destination, i.e., the second or third users 10b, 10c. Therefore, it is desirable to have a global-scale communication system 100 having HACDS 200 capable of bi-directional free-space laser communication between two moving HACDs 200 or one moving HACD 200 and a gateway 300 (stationary or moving). In addition, it is desirable that the HACDs 200 and the gateways 300 of the global-scale communication system 100 communicate amongst each other and between one another, without using complex free space architectures. Moreover, it is desirable to have a cost effective system. Therefore, it is important to reduce the cost of parts that allow such communications, which ultimately reduces the total weight and the size of the HACDs 200 and the gateways 300. As will be discussed, the transceiver system 400 included in each HACD 200 or gateway 300 reduces the number of components used within the transceiver system 400 by eliminating the use of two fiber tips 472, which also reduces the number of steerable mirrors 420. Another aspect to be considered when designing such systems is the fast speed that the HACDs 200 are moving around the earth 30. This causes a change in the angle between a received signal B1 and a transmitted signal B2 (discussed with respect to FIGS. 4A-4G below). The transceiver 400 is configured to adjust the transition beam B2 to accommodate for the relative movement of the HACDs 200.

Communication balloons 200a are balloons filled with helium or hydrogen and are released in to the earth's stratosphere to attain an altitude between 11 to 23 miles, and provide connectivity for a ground area of 25 miles in diameter at speeds comparable to terrestrial wireless data services (such as 3G or 4G). The communication balloons 200a float in the stratosphere, at an altitude twice as high as airplanes and the weather (e.g., 20 km above the earth's surface). The high-altitude balloons 200a are carried around the earth 30 by winds and can be steered by rising or descending to an altitude with winds moving in the desired direction. Winds in the stratosphere are usually steady and move slowly at about 5 and 20 mph, and each layer of wind varies in direction and magnitude.

Referring to FIG. 1C, the communication balloons 200a include a balloon 204 (e.g., sized about 49 feet in width and 39 feet in height), an equipment box 206a, and solar panels 208. The equipment box 206a includes a data processing device 210 that executes algorithms to determine where the high-altitude balloon 200a needs to go, then each high-altitude balloon 200a moves into a layer of wind blowing in a direction that may take it where it should be going. The equipment box 206a also includes batteries to store power and a transceiver system 400 in communication with the data processing device 210. The transceiver system 400 receives and transmits signals from/to other balloons 200a or internet antennas on the ground or gateways 300. The communication balloons 200a also include solar panels 208 that power the equipment box 206a. In some examples, the solar panels 208 produce about 100 watts in full sun, which is enough to keep the communication balloons 200a running while charging the battery and is used during the night when there is no sunlight. When all the high-altitude balloons 200a are working together, they form a balloon constellation. In some implementations, users 10 on the ground have specialized antennas that send communication signals to the communication balloon 200a eliminating the need to have a source or destination ground station 310, 320. The communication balloon 200a receiving the communication 20 sends the communication 20 to another communication balloon 200a until one of the communication balloons 200a is within reach of a destination ground station 320 that connects to the local internet provider and provides service to the user 10 via the network of balloons 200a.

A satellite 200b is an object placed into orbit around the earth 30 and may serve different purposes, such as military or civilian observation satellites, communication satellites, navigations satellites, weather satellites, and research satellites. The orbit of the satellite 200b varies depending in part on the purpose the satellite 200b is being used for. Satellite orbits may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 30) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

Multiple satellites 200b working in concert form a satellite constellation. The satellites 200b within the satellite constellation may be coordinated to operate together and overlap in ground coverage. Two common types of constellations are the polar constellation (FIG. 1A) and the Walker constellation (FIG. 1B), both designed to provide maximum earth coverage while using a minimum number of satellites 200b. The system 100a of FIG. 1A includes the satellites 200b arranged in a polar constellation that covers the entire earth 30 and orbits the poles, while the system 100b of FIG. 1B includes satellites 200b arranged in a Walker constellation that covers areas below certain latitudes, which provides a larger number of satellites 200b simultaneously in view of a user 10 on the ground (leading to higher availability, fewer dropped connections).

Referring to FIG. 1D, a satellite 200b includes a satellite body 206b having a data processing device 210, similar to the data processing device 210 of the communication balloons 200a. The data processing device 210 executes algorithms to determine where the satellite 200b is heading. The satellite 200b includes a transceiver system 400 that receives and transmits signals from/to other satellites 200b or internet antennas on the ground or gateways 300. The satellite 200b includes solar panels 208 mounted on the satellite body 206b. The solar panels 208 provide power to the satellite 200b. In some examples, the satellite 200b includes rechargeable batteries used when sunlight is not reaching and charging the solar panels 208.

When constructing a global-scale communications system 100 from multiple HACDs 200, it is sometimes desirable to route traffic over long distances through the system 100 by linking one HACD 200 to another or to a gateway 300. For example, two satellites 200b, two balloons 200a, or a satellite 200b and a balloon 200a may communicate via optical links 22. In some examples, optical links 22 between two similar devices are called inter-device links (IDL) 22. In addition, HACDs 200 and gateways 300 may communicate using optical links 22. In such cases, the gateways 300 may also include a transceiver system 400 or other component capable of communicating with the transceiver system 400 (of the communication balloon 200a or the satellite 200b). Such optical links 22 are useful to provide communication services to areas far from source and destination ground stations 310, 320 and may also reduce latency and enhance security.

In some implementations, long-scale HACD constellations (e.g., balloon constellation or satellite constellations) are described in terms of a number of planes or groups 202, and the number of HACDs 200 per plane 202. HACDs 200 within the same plane 202 maintain the same position relative to their intra-plane HACD 200 neighbors. However, the position of an HACD 200 relative to neighbors in an adjacent plane 202 varies over time. For example, in a large-scale satellite constellation with near-polar orbits, satellites 200b within the same plane (which corresponds roughly to a specific latitude, at a given point in time) 202ba (FIG. 1A) maintain a roughly constant position relative to their intra-plane neighbors (i.e., a forward and a rearward satellite 200b), but their position relative to neighbors in an adjacent plane 202bb, 202bc, 202bd varies over time. A similar concept applies to the communication balloons 200a; however, the communication balloons 200a rotate the earth 30 about its latitudinal plane and maintain roughly a constant position to its neighboring communication balloons 200a (see the balloon planes 202aa, 202ab in FIG. 1A).

Optical links 22 eliminate or reduce the number of HACDs 200 to gateway hops (due to the ability to link HACDs 200), which decreases the latency and increases the overall network capabilities. Optical links 22 allow for communication traffic from one HACD 200 covering a particular region to be seamlessly handed over to another HACD 200 covering the same region, where a first HACD 200 is leaving the first area and a second HACD 200 is entering the area.

In some implementations, an HACD constellation includes HACDs 200 having enough optical links 22 to make the constellation fully-connected, where each HACD 200 is equipped with communication equipment and additional antennas to track the location of other HACDs 200 in the same plane 202 or in other adjacent planes 202 in order to communicate with the other satellites 200b. This increases the cost of the HACD 200, since it adds additional hardware (e.g., the additional antennas) and computations for the HACD 200 to track HACDs 200 in other planes 202 whose position is constantly changing. Therefore, to maintain the simplicity and low cost of design, construction, and launch of the system 100, the system 100 includes a transceiver system 400 configured to allow sharing of main parts within the HACDs 200 or the gateways 300 (discussed below).

A ground station 300 is usually used as a connector between HACDs 200 and the internet, or between HACDs 200 and users 10. Therefore, the combination of the HACD 200 and the gateways 300 provides a fully-connected global-scale communication system 100 allowing any device to communicate with another device.

Referring to FIG. 2, the global-scale communication system 100 includes the system data processor 110 in communication with an HACD 200 (communication balloons 200a and satellites 200b) having a transceiver system 400 allowing it to communicate with other HACDs 200 and gateways 300 (e.g., source gateway 310, destination gateway 320, and/or linking gateway 330).

Figure 3:
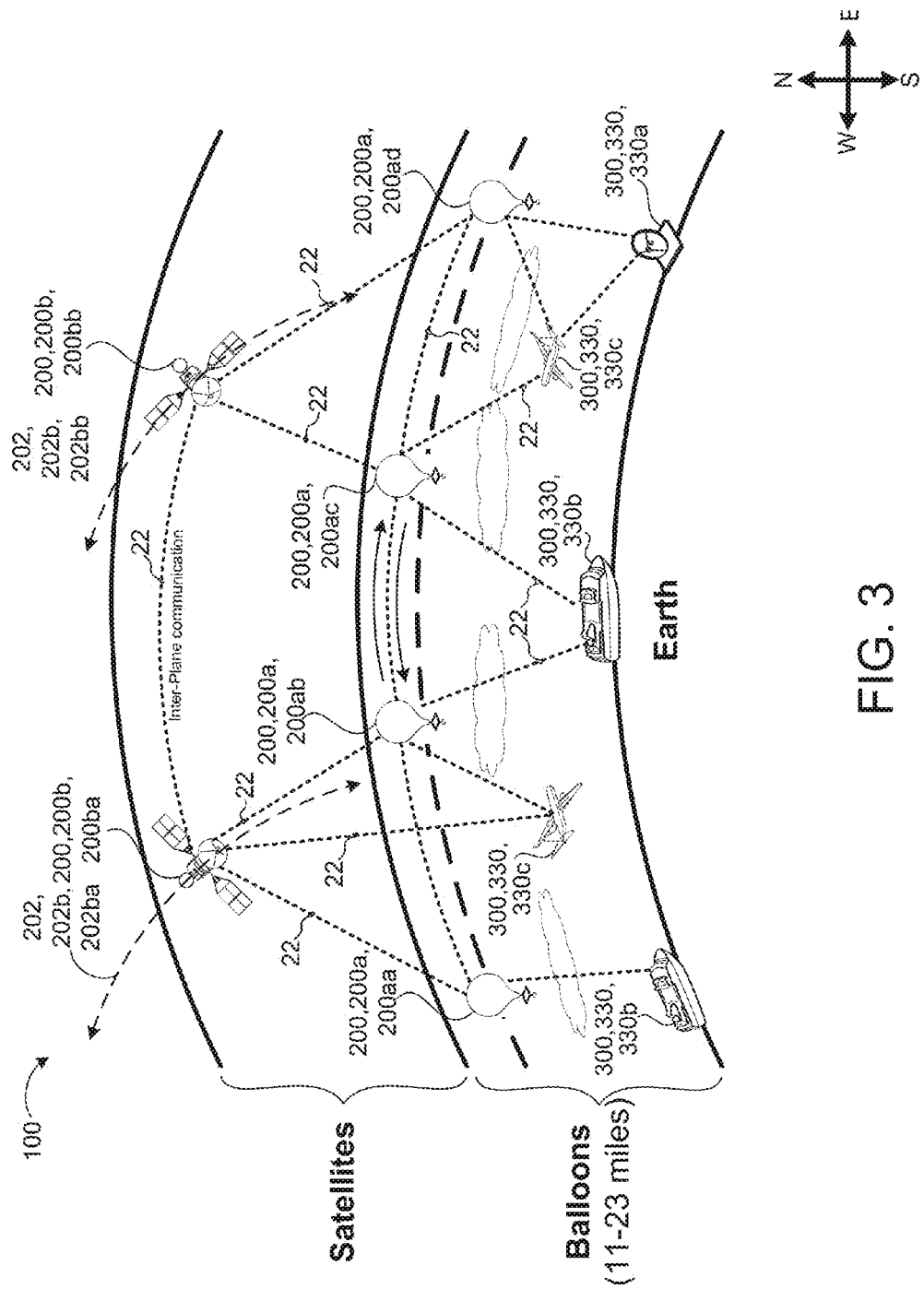
FIG. 3 is a schematic view of an exemplary global-scale communication system showing multiple devices communicating.

Referring to FIG. 3, the linking-gateways 330 may be stationary linking-gateways 330a or a moving linking-gateway 330b, 330c (e.g., positioned on a moving object, such as an airplane, train, boat, or any other moving object). In some examples, a global-scale communication system 100 includes a constellation of balloons 200a, a constellation of satellites 200b, gateways 300 (source ground station 310, destination ground station 320, and linking-gateway 330), each of which may communicate with the other. The figure shows multiple optical links 22 between the devices that may be possible. For example, the global-scale communication system 100, as shown, includes two satellites 200ba, 200bb, four communication balloons 200aa, 200ab, 200ac, 200ad, and five gateways 300 (moving and stationary). Each of the shown devices 200, 300 may communicate with another device using the optical link 22 as long as the two devices are capable of seeing each other and emitting a communication 20 capable of being received by the other device 200, 300 (using the transceiver system 400).

Referring to FIGS. 4A-4G, in some implementations, a communication system 400 (also referred to as a transceiver system) includes a transparent refractive optical wedge 410, a steerable mirror 420, a position feedback device 430, and a transceiver 440. The transceiver system 400 is configured to simultaneously transmit and receive optical beams B1, B2 (e.g., optical signals) at different angles, by sharing the same fiber tip 472 between the transmit and the receive beams B1, B2, which eliminates misalignment between the receive and transmit beams B1, B2 due to shock and vibration of the transceiver system 400 caused by different factors. In addition, the transceiver system 400 uses one fiber tip 472 for both the transmit beam B1 and the receive beam B2, as opposed to what was previously used, which is two fiber tips (i.e., reducing the number of components, thus reducing the cost of the transceiver).

Figure 4A:
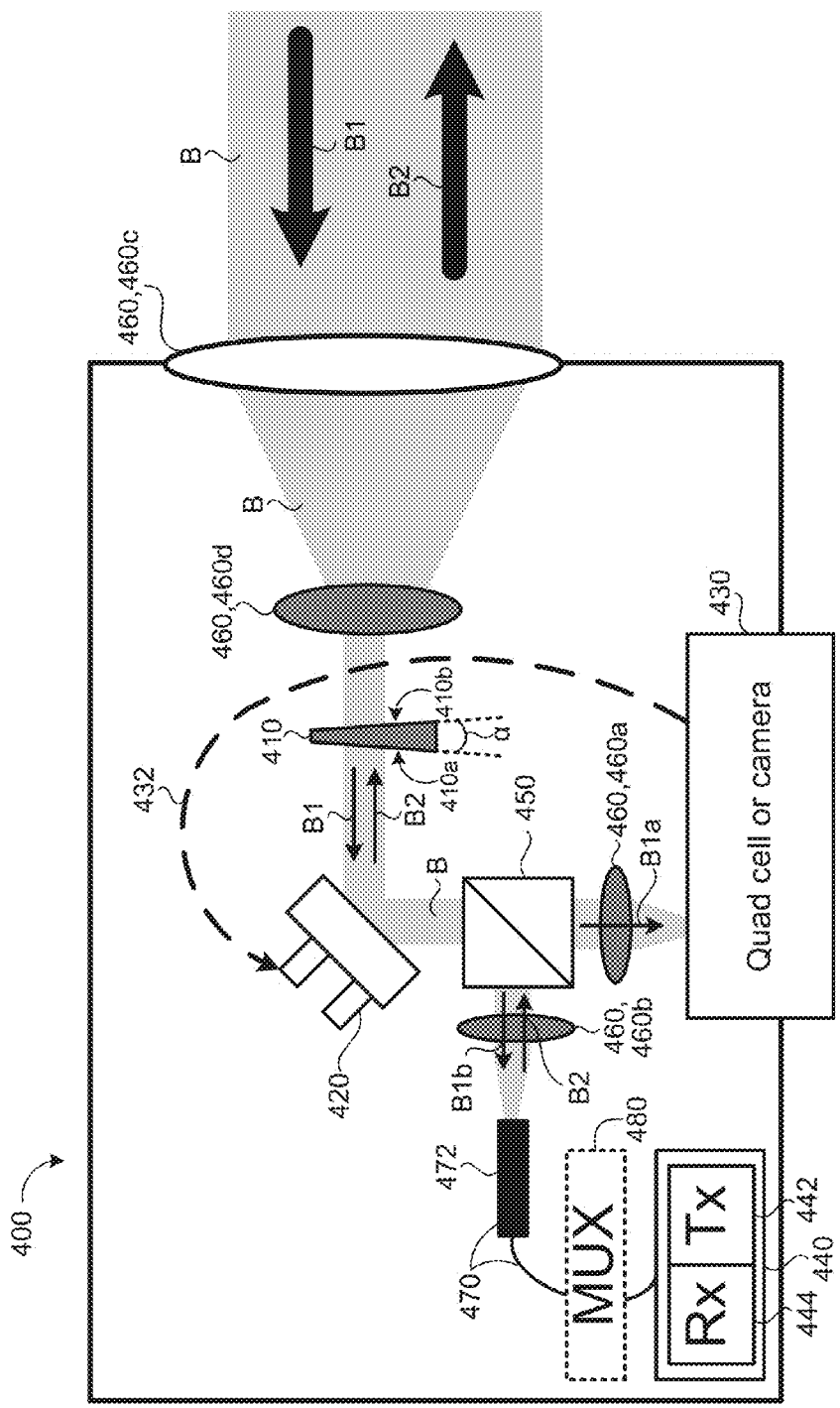
FIG. 4A is a schematic view of an exemplary transceiver.
Figure 4B:
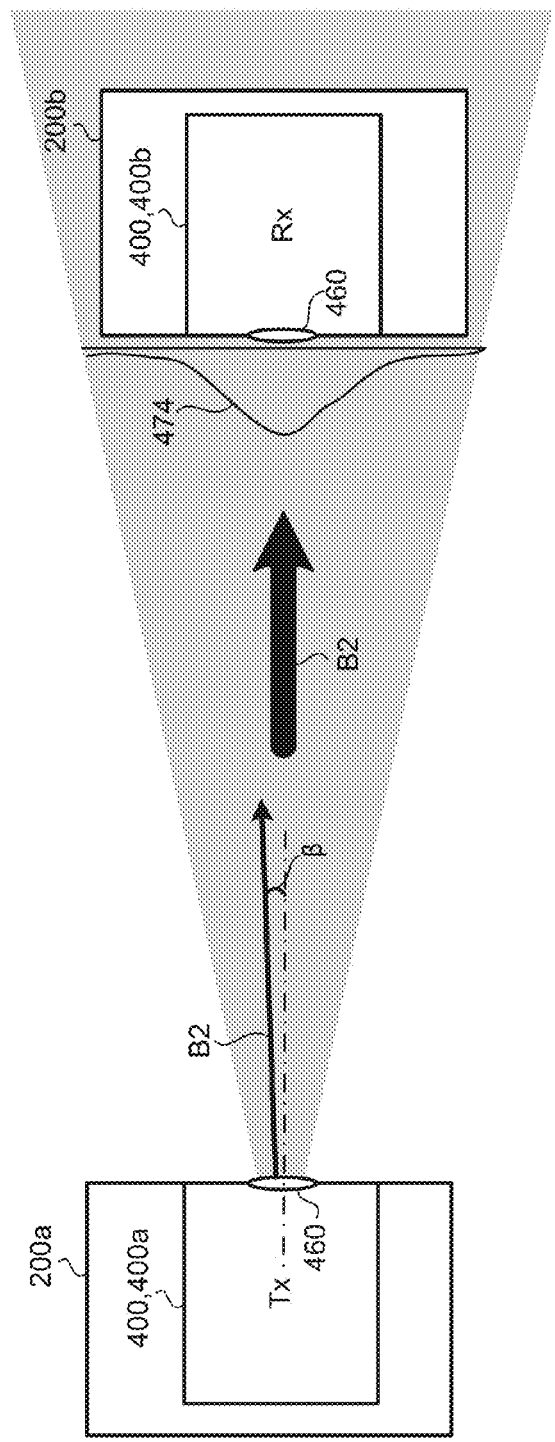
FIG. 4B is a schematic view of two exemplary transceivers communicating.
Figure 4D:
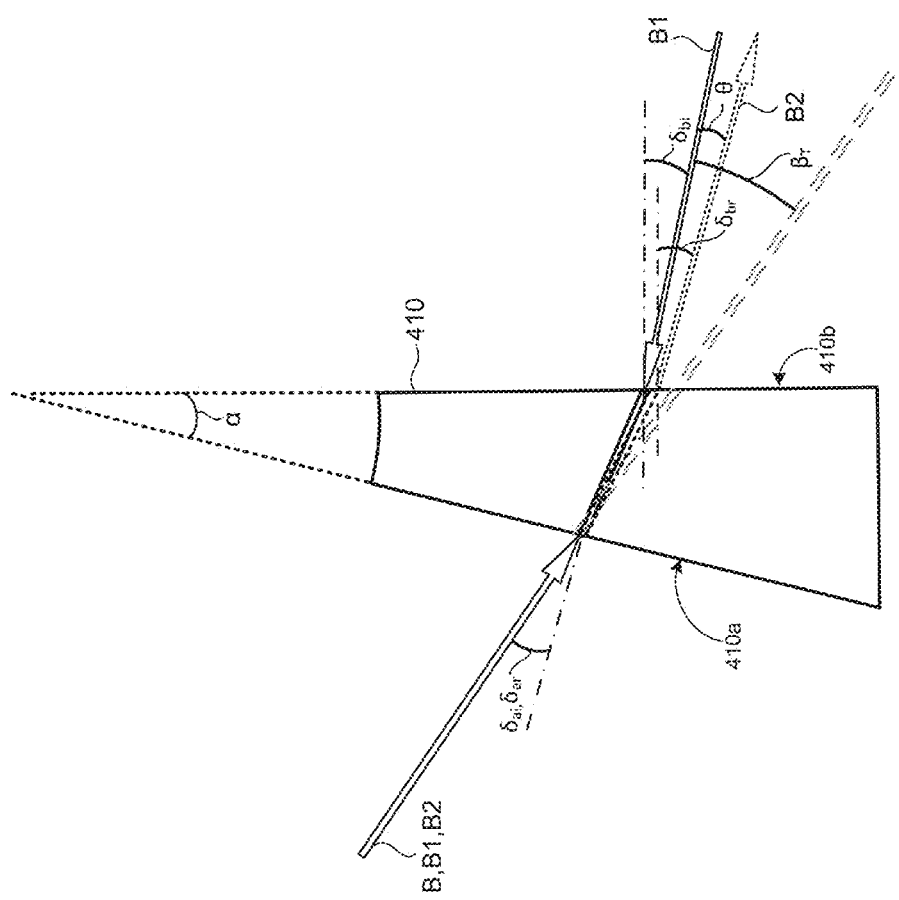
FIG. 4D is a schematic view of an exemplary transparent wedge of the transceiver of FIG. 4A.
Figure 4E:
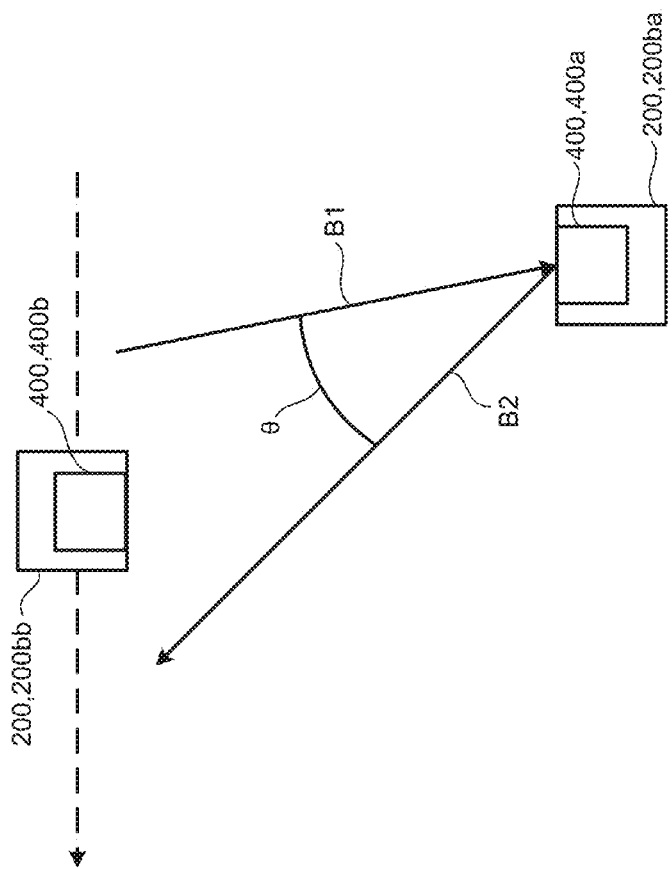
FIG. 4E is a perspective top view of two exemplary transceivers emitting and receiving optical beams.

The transceiver system 400 is configured to achieve two main functions simultaneously: first, the transceiver system 400 receives a first optical beam B1 and directs it to the fiber tip 472 (FIG. 4C); second, the transceiver system 400 transmits a second optical beam B2 and aims it to a second transceiver system 400b (FIG. 4B). For example, the first transceiver system 400a has to maintain a position of the transmitted beam B1 centered on an aperture 460 of the second transceiver system 400b receiving the transferred beam B2, as shown in FIG. 4B; and the second transceiver system 400b (or the receiving transceiver system) receives the second beam B2, collects the beam at its aperture 460 and centers it on the fiber tip 427, as shown in FIG. 4C.

Referring to FIG. 4B, in some implementations, a first device (e.g., HACD 200 or gateway 300) having a first transceiver 400a and a second device (e.g., HACD 200 or gateway 300) having a second transceiver system 400b establish a communication link between each other. The first transceiver system 400a transmits an optical signal B2 to the second transceiver system 400b. The first transceiver system 400a focuses the optical beam towards the second transceiver system 400b. Since there is a long distance between the first transceiver system 400a and the second transceiver system 400b, the first transceiver system 400a has to make sure that the transmission angle β is accurate so that the optical beam is received by the second transceiver system 400b. The transmission angle β is the angle between the transmitted optical beam B2 measured from a perpendicular line to the transceiver system 400a. Thus, the first transceiver system 400a adjusts its transmission angle β to focus the transmitted beam B2 on the second transceiver system 400b. If the first HACD 200a that includes the first transceiver system 400a is moving at a different velocity than the second HACD 200b that includes the second transceiver system 400b, then the first transmitter 400a has to constantly adjust its transmission angle β to accommodate for the change in the relative velocity of the moving HACDs 200.

FIG. 4C shows the second transceiver system 400b of FIG. 4B that receives the transmitted beam B2 from the first transceiver system 400a. The second transceiver system 400b receives the transmitted beam B2 from the first transceiver system 400a at an optical lens 460 that collects the beam B2 and focuses the beam B2 on a fiber tip 472. The acceptance and intensity of the transmitted beam B2 received by the fiber tip 472, illustrated by an intensity curve 474 in the example shown, is directly dependent on the alignment of the transmitted beam B2 with the fiber tip 472 and an acceptance angle of the fiber tip 472. Therefore, the second transceiver system 400b has to either point the transmitted beam B2 towards the center of the fiber tip 472 or internally steer the fiber beam B2 towards the center of the fiber tip 472. The fiber tip 472 is an optical microcomponent at the end of the optical fiber for reconfiguring light entering or exiting the optical fiber. The fiber tip 472 facilitates fiber-based amplification and/or fiber based combination with a local oscillator (e.g., an internal reference laser source) to maximize the signal. The fiber tip 472 may be a single-mode fiber having a diameter of 10 microns.

In some examples, silica core/silica clad fiber is used to fabricate the fiber tip 472. Silica core and polymer clad fiber may also be used. In some examples the fiber has a core diameter between 200 μm to 2000 μm. The process of fabricating the fiber tip 472 may be either mechanical or thermal mostly involving laser machining. The fiber tip 472 is a continuation of the fiber itself; therefore, there is no additional interfaces that cause optical loss.

Referring back to FIGS. 4A and 4D, in some examples, the transparent refractive optical wedge 410 has first and second faces 410a, 410b angled at an angle α with respect to each other (e.g., angle α being greater than zero). The transparent refractive optical wedge 410 receives first and second optical beams B1, B2 through both the first and second faces 410a, 410b. The first optical beam B1 may be a receiving beam B1 and the second optical beam B2 may be a transmitting beam B2, or vice versa. The first and second faces 410a, 410b are arranged so that the first and second optical beams B1, B2 travel along parallel or common paths through the first face 410a and diverge at a deflection angle θ (e.g., between 0 degrees and about 0.1 degrees) with respect to each other through the second face 410b. The transparent refractive optical wedge 410 allows the transceiver system 400 to simultaneously receive/transmit two optical beams B1, B2 and diverge the two optical beams B1, B2 into the collimated beam B. A collimated light beam B includes light rays that are parallel, or focused at infinity.

The transparent refractive optical wedge 410 has an index of refraction. A refractive index (also known as an index of refraction) of a substance is a dimensionless number describing how light propagates through that substance. The refractive index determines how much light is bent or refracted within the substance. The refractive index varies with the wavelength of light, as considered by Snell's law, so does the refractive angle. A refractive angle $\delta_{ar}$, $\delta_{br}$ is the angle between a ray of light reflected out of a surface (e.g., the wedge surface 410a, 410b) and a line perpendicular to that wedge surface 410a, 410b at the point the light exits the wedge surface 410a, 410b. An incidence angle $\delta_{ai}$, $\delta_{bi}$, or angle of incidence, is the angle between a ray of light incident on a surface (e.g., the wedge surface 410a, 410b) and a line perpendicular to that surface at the point of incidence (called the normal). Since the received beam B1 and the transmit beam B2 each have a different wavelength (different color), each beam B1, B2 bends or refracts differently within the wedge 410. In some examples, the transmit beam and the receive beam are separated by 20 nm wavelength. This causes the collimated beam B on the first side of the wedge 410a to diverge as it passes through to the second side of the wedge 410b, causing an angle referred to as a point-ahead angle θ between the first beam B1 and the second beam B2. The first and second optical beams B1, B2 may have a wavelength separation of about 20 nm. In some examples, the optical beams received through the optical wedge 410 are collimated.

The sensitivity of a point-ahead angle θ to a wedge angle and wedge incidence angle $\delta_{ai}$, $\delta_{bi}$ is very low, therefore, there are loose requirements on how thick the wedge 410 is as well as how to position the wedge 410 in the optical path, making the wedge 410 easy to manufacture and assemble. However, there is a practical limit to how much point-ahead angle θ is achievable, but the fastest moving HACDs 200 generally require no more than 100 micro-radians of point-ahead angle θ. If however, a greater point-ahead angle θ is needed, multiple wedges may be used to achieve the greater point-ahead angle θ.

Therefore, the wedge 410 may be designed to accommodate for specific point ahead-angles θ. The optical wedge 410 may have an incidence angle $\delta_{ai}$, $\delta_{bi}$ on both surfaces of up to about 20 degrees. The optical wedge 410 may have a refractive angle $\delta_{ar}$, $\delta_{br}$ on both surfaces of up to about 20 degrees. The angle of incident $\delta_{ai}$ and the angle of refraction $\delta_{ar}$ of the first side 410a of the optical wedge 410 are equal. This is because the wedge 410 is designed to change the angle θ between the received beam B1 and the transmitted beam B2, so that after the beams B1, B2 go through the wedge 410 from the second surface 410b to the first surface 410a, the beams B1, B2 are parallel. Similarly, if the beams B1, B2 are going from the first surface of the wedge 410a to the second surface of the wedge 410b, the wedge 410 separates the beams B1, B2 by a point-ahead angle θ. The wedge 410 can be anywhere in the optical path where the beam is collimated (not converging or diverging), causing the collimated beam to diverge. In some implementations, to achieve a greater angle, multiple wedges 410 are used. In addition, the wedge 410 may be rotated in two-dimensions, e.g., "pitch" and "roll" to have full control of the point-ahead angle θ in azimuth and elevation.

In some examples, the optical wedge 410 includes a fused silica wedge and the first and second faces 410a, 410b are angled with respect to each other by an angle α of between about 12 degrees and about 16 degrees, other angles α are possible as well.

A deflection angle $\beta_T$ is the total deflection of the beam that occurs within the wedge 410 and includes the deflection of the collimated beam B entering the first side 410a of the wedge 410 and exiting the second side 410b of the wedge 410. In some examples, the deflection angle $\beta_T$ is about 20.8 degrees. Other deflection angles are also possible, and depend on the design and requirement of the point-ahead angle θ.

The steerable mirror 420 is in optical communication with the first face 410a of the optical wedge 410. The steerable mirror 420 changes the path of the optical beam B. For example, referring back to FIG. 4A, after the optical beam passes through the optical wedge 410, the direction of the beam B is corrected so that the beam B is steered to go to the beam splitter 450. The steerable mirror 420 may be a fast steering mirror that enables real-time angular corrections in pointing and tracking systems for directing energy systems, long range laser communications, and telescopes. The steerable mirror 420 may be designed using metal (e.g., aluminum or beryllium), glass, silicon, or silicon carbide substrates. The steerable mirror 420 includes one or more actuators to steer the steerable mirror 420 based on the position feedback device 430.

The position feedback device 430 is in optical communication with the steerable mirror 410 and sends the steerable mirror 410 a feedback 432. The position feedback device 430 senses an alignment of one of the beams B1, B2 that reflect off of the steerable mirror 420 with the position feedback device 430 and adjusts a position of the steerable mirror 420 to maintain the alignment of the reflected beam with the position feedback device 430.

The position feedback device 430 may be a position sensitive detector (PSD), a quadrant detector (quad cell) or a multi-element camera array. PSDs are of two kinds, a first kind having an isotropic sensor surface that has a raster-like structure that supplies continuous position data and a second kind that has discrete sensors on the sensor surface that supply local discrete data.

A quad-cell detector is a silicon photodetector with four active photodiode areas separated by gaps, as compared to a bi-cell detector having two active photodiode areas. The quad-cell detector is capable of measuring extremely small changes in the position of a light beam and is used for centering, nulling and detecting and measuring position displacement.

A multi-element camera array provides a full intensity profile, which allows for the calculation of the beam centroid to give the position information of the beam. The use of a camera as the position feedback device 430 has an advantage that its image may be used for other beam-diagnostic purposes, thus providing an additional control or diagnostics of the optical system. A multi-element camera includes a data processor, therefore it is more complex than a PSD or a quad-cell.

If the second transceiver system 400b moves, then the received optical beam B1 at the first transceiver system 400a is received at a different angle than what is expected by the system 400a (the angle is detected using the position feedback device 430), therefore the steerable mirror 420 may adjust its angle to compensate for the movement of the first beam B1 received from the second transceiver system 400b. Since the transceiver 400 is sharing the receive and transmit beams B1, B2, then the transmit beam B2 may automatically adjust its look-ahead angle based on the new location of the second transceiver 400b. The look-ahead angle θ is a constant angle due to the properties of the refractive properties of the wedge 410.

Referring back to FIG. 4A, the transceiver system 400 includes a transceiver 440 in optical communication with the steerable mirror 420 and has an optical transmitter 442 transmitting one of the optical beams B1 and an optical receiver 444 receiving the other optical beam B2. In some implementations, the optical transmitter 442 transmits the first optical beam B1 and the optical receiver 444 receives the second optical beam B2. The first and second optical beams B1, B2 travel along a common path between the transceiver 440 and the optical wedge 410. The optical wedge 410 causes the first optical beam B1 to travel along a first path away from the second face 410b of the optical wedge 410 at the deflection angle, i.e., the point-ahead angle θ, with respect to a second path of the second optical beam B2 travelling toward the second face 410b of the optical wedge 410.

The communication system 400 may include a beam splitter 450 in optical communication with the steerable mirror 420, the position feedback device 430, and the transceiver 440. A beam splitter 450 is an optical component that splits a beam of light in two. Generally, a beam splitter 450 includes two triangular glass prisms glued together using polyester, epoxy, or urethane-based adhesives. The thickness of the adhesive layer is adjusted so that half of the light incident through one face of the cube is reflected and the other half is transmitted due to frustrated total internal reflection. In some examples, the beam splitter 450 is a half-silvered mirror, a sheet of glass or plastic with a transparently thin coating of metal, e.g., aluminum deposited from aluminum vapor. The thickness of the deposit is controlled so that a fraction of the light, which is incident at a 45-degree angle and not absorbed by the coating is transmitted, and the remaining fraction of the light is reflected. In some examples, instead of the metal coating, a dichroic optical coating is used. In this case, the ratio of reflection to transmission depends on the wavelength of the incident light. Yet another example of a beam splitter 450 is a dichroic mirrored prism assembly that uses dichroic optical coating to divide the incident optical beam into a number of spectral distinct output beams.

In the example shown, the beam splitter 450 is arranged to split one of the beams (e.g., B2) travelling from the steerable mirror 420 to the beam splitter 450. The beam splitter 450 splits the first beam B1, i.e., the received beam B1. The beam splitter 450 also directs a first portion of the split beam B1a to the position feedback device 430 and a remaining second portion of the split beam B1b to the transceiver 440. In some examples, the first portion of the split beam B1a is about 10% of the beam B, and the second portion of the split beam B1a and the transmitted beam B2 are about 90% of the beam B. Other ratios are also possible. As previously discussed, the position feedback device 430 uses the first portion of the split beam B1a to determine if the steerable mirror 420 needs any adjustments. Moreover, since the look-ahead angle is constant, the position feedback device 430 is capable of adjusting the steering mirror based on the feedback from the portion of the split beam B1a, which is a portion of the received beam B1, only since the look-ahead angle automatically adjusts based on the angle of the received beam B1.

The transceiver system 400 further includes a first optical lens 460a arranged to focus the first portion of the split beam B1 travelling from the beam splitter 450 to the position feedback device 430.

The transceiver system 400 may include a second optical lens 460b arranged to focus the second portion of the optical beams B1b and the second optical beam B2 (transmitted) travelling between the beam splitter 450 and the transceiver 440. The second optical lens 460b collimates the transmitted beam B2 so that it travels in a tight beam with as little divergence, or spread, as possible.

The transceiver system 400 may also include a third optical lens 460c arranged to focus the first and second beams B1, B2 traveling to and from the second surface 410b of the wedge 410. In some implementations, the communication system 400 further includes a fourth optical lens 460d in optical communication with the optical wedge 410 and arranged to focus the beams B, B1, B2 travelling to and from the second face 410b of the optical wedge 410. The fourth optical lens 460d may be positioned between the third optical lens 460c and the wedge 410. The transceiver system 400 may include other optical lenses positioned in different portions of the system 400. For example, an optical lens may be positioned between the steerable mirror 420 and the first side of the optical wedge 410a, or between the steerable mirror 420 and the beam splitter 450. In some implementations, mirrors may be used instead of the optical lenses 460, for example, two or more mirrors may be used to expand/contract a diameter of the beam B, B1, B2 depending on the direction of the beam B, B1, B2. The combination of the lenses 460 (or mirrors) provide an afocal system, i.e., a system that has an infinite effective focal length.

The communication system 400 may include an optical fiber 470 in optical communication with the transceiver 440. The second optical lens 460b directs the optical beams between the fiber tip 472 of the optical fiber 470 and the beam splitter 450.

Moreover, the communication system 400 may include a multiplexer 480 optically coupled to the optical fiber 470 and in optical communication with the transceiver 440. A multiplexer (MUX) 480 receives and combines several separate input signals and outputs a combined signal. The multiplexed signal is transmitted through a physical wire, which saves the cost of having multiple wires for each signal. A demultiplexer (DEMUX) is the reverse process of the MUX 480. The demultiplexer receives the multiplexed/combined signal and divides it into the separate signals that were originally combined. Therefore, to combine multiple signals having different wavelengths into one signal, a MUX 480 is used; while, to combine a signal into multiple signals, a DEMUX is used. Multiplexing is a method used in optical networks to utilize the large bandwidth of optics to their full extent. Multiplexing enables several virtual channels to be formed on a single fiber. Therefore, multiplexing several optic signals increases the connectivity of a network. The multiplexer 480 may be a wavelength division multiplexer (WDM) 480 or a time division multiplexer (TDM) 480. The WDM 480 multiplexes or demultiplexes optical signals. Wavelength division multiplexing (WDM) multiplexes the signals by having different virtual channels use different wavelengths. Time division multiplexing (TDM) is a method used to multiplex several signals onto one fiber optic. TDM multiplexes several signals by establishing different virtual channels using different time slots.

Figure 4F:
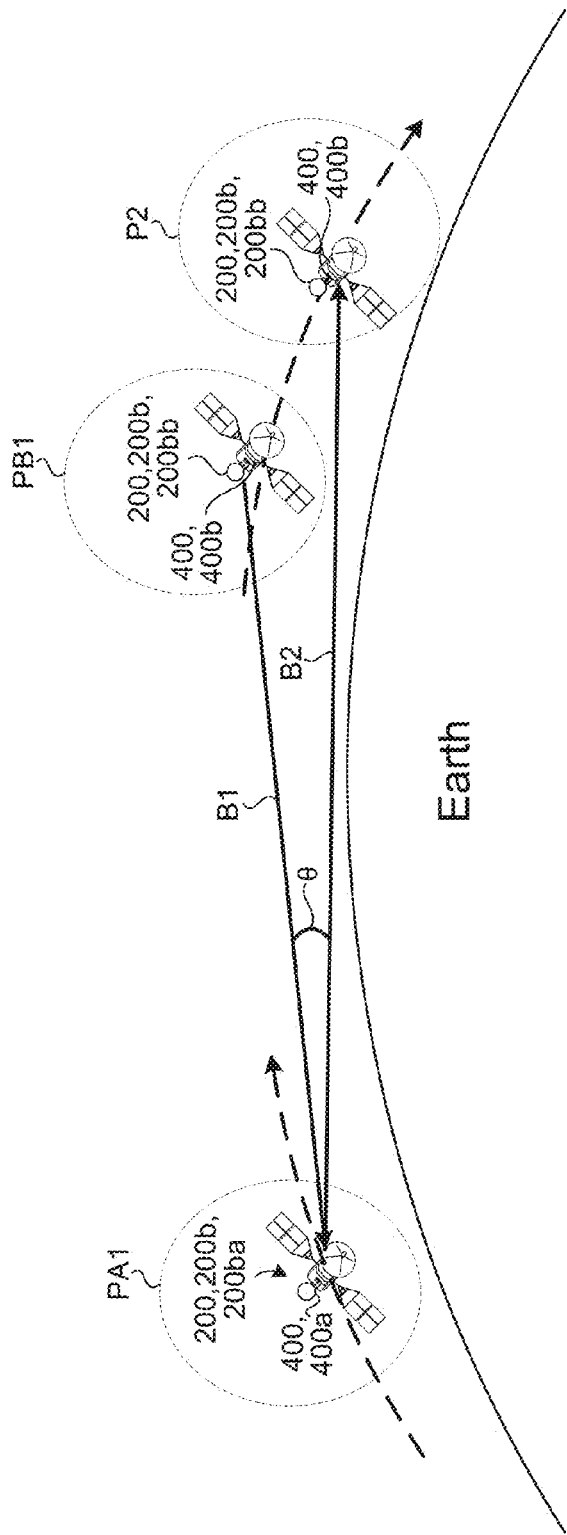
FIG. 4F is a perspective side view of the two exemplary transceivers of FIG. 4E emitting and receiving optical beams.

Referring to FIG. 4F, a first HACD 200ba is in communication with a second HACD 200bb. Both the first and the second HACDs 200ba, 200bb include the transceiver of FIG. 4A. Therefore, the first HACD 200ba receives an optical beam B1 from the second HACD 200bb and transmits a transmit beam B2 at a look-ahead angle θ, since by the time the first transceiver 200ba receives the first beam B1 from the second HACD 200bb, the second HACD 200bb has moved from a first position P1 where it sent the receive beam B1 to a second position P2. Therefore, the first receiver 200bb transmits the second beam B2 at a look-ahead angle θ so that the second HACD 200bb receives the transmitted beam B2 at the second position P2. Moreover, if the second HACD 200bb transmits a signal (not shown) back into the first transceiver system 400a, the second transceiver system 400b has to send the signal at an angle from the received optical beam B2. Therefore, and as previously discussed, HACDs 200 rotate about the earth 30 in groups or planes 202 in the distance between the HACDs 200 and are substantially fixed (i.e., the relative motion between that HACDs 200 is the same with an airplane or group 202), resulting in a fixed point-ahead angle θ. Moreover, as shown in FIG. 4F the point-ahead angle θ applies to the HACD 200 forward a current HACD 200 or backward the current HACD 200.

In some examples, the point-ahead angle θ (in radians) is determined by the following equation:

$$\theta = \frac{2 * v_t}{c} \tag{1}$$

where $v_t$ is the relative velocity between two devices ($v_t = v_2 - v_1$; $v_1$ is the velocity of the first device and $v_2$ is the velocity of the second device), and c is the speed of light. Assuming that the relative velocity $v_t$ is 1200 meters per second, the point-ahead angle θ equals 8 micro radians (2*1200/3e8).

The point-ahead angle θ is constant and does not need any actuators to control it, which reduces the complexity, power, weight, and setup time of the transceiver system 400. This is because of the inherently loose tolerances in both manufacture and installation of the wedge 410. For the same application, a precision mirror and/or fiber actuator would need to be set with much tighter tolerances (micro-radians or microns). During shipping and deployment of the transceiver 400, errors of that magnitude are inevitable because the structure may shift or bend at that magnitude. So, even though the mirror and/or fiber positioner may never need to move operationally, the initial deployment of such systems may require an actively controlled calibration phase where small errors need to be sensed and removed, which would require coordination between the two remote systems (i.e., the remote receiver needs to "tell" the transmitter when it has received maximum power). The transceiver system 400 shares the same fiber tip 472 for the receive and transmit beams B1, B2, so that shock and vibration of the system 400 cannot cause misalignment between the receive and transmit beams B1, B2.

Figure 4G:
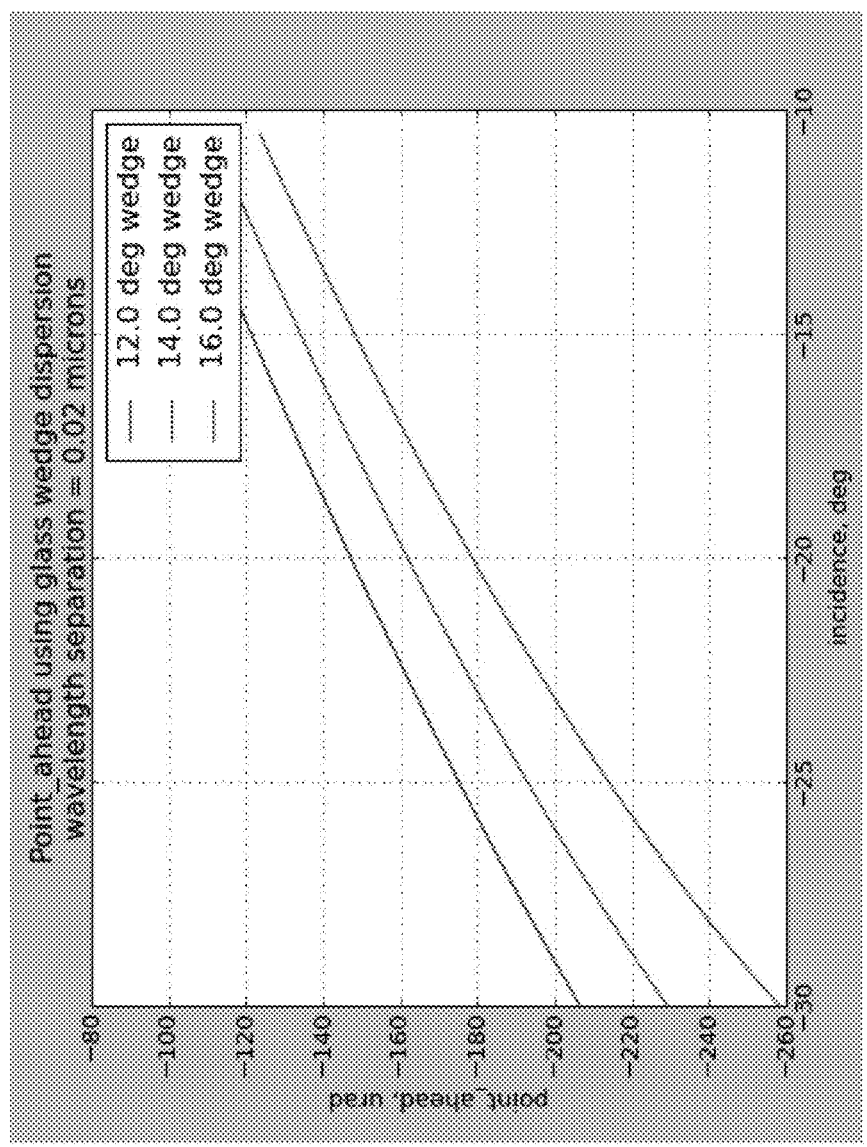
FIG. 4G is a schematic view of a table representing the wedge incident angle verses the point-ahead angle.

FIG. 4G illustrates an exemplary graph illustrating point-a-head angle θ (in radians) versus incidence angle $\delta_{ai}$, $\delta_{bi}$ of the wedge 410. In the example shown, the point-a-head angle θ and the incidence angles $\delta_{ai}$, $\delta_{bi}$ of the wedge 410 may have a tolerance of about one degree. The tolerance of the wedge 410 allows for accidental rotation of the wedge 410 and/or a manufacturing tolerance of the wedge 410. For example, if the wedge 410 is accidently rotated four degrees, or the wedge is made 1.2 degrees too thick, then an error in the point-a-head angle θ is only one micro-radian. As such, the allowable tolerances of the wedge 410 allow for relatively less precise manufacturing or assembly of the transceiver system 400.

Gateways 300 (moving or nonmoving) as well as HACDs 200 may include the transceiver system 400. In some examples, (not shown) a first gateway 300 is in communication with a second gateway 300, and a third gateway 300. The second gateway 300 includes the transceiver 400. The first gateway 300 includes a transmitter and the third gateway 300 includes a receiver. The first gateway 30 sends the second gateway 300 (that includes the transceiver 400) a first beam B1, the second gateway 300 receives the signal and simultaneously sends a second beam B2 to the third gateway 300. Therefore, the look-ahead angle is used when a gateway 300 is designed to only transmit signals and another gateway 300 at a different location is designed to only receive optical signals. Thus the look ahead-angle is useful to allow such a configuration of devices.

While the wedge 410 includes a fixed point-ahead angle θ, in some implementations, the point-ahead angle θ needs adjustment during operation. Some of the methods of adjusting the point ahead angle include: rotating the wedge 410; tuning the wavelengths of the first and second beams (the reflection is based on the wavelength of the optical beams); applying a net electric charge to the wedge 410, when the wedge 410 is made of a semiconductor material, therefore applying a "carrier effect"; adjusting the properties of the wedge 410 and thus adjusting the index of refraction of the wedge 410; heating or cooling the wedge 410, which also affects the properties of the wedge 410 and thus changes its refractive index; subjecting the wedge 410 to an electric field, such as that created between the plates of a capacitor, if the wedge 410 material is crystalline (Lithium Niobate for example), the electro-optic effect changes the properties of the wedge 410 causing a change in the refractive index of the wedge 410; applying a magnetic field to the wedge 410, which also causes changes the properties of the wedge 410 causing a change in the refractive index of the wedge 410; and, finally, adding another wedge 410 (one or more) to change the point-ahead angle θ. Changing the point-ahead angle θ may also cause a change in the steerable mirror 420 to make sure that the beams are accurately transmitted from a first device and received by the second device.

Figure 5:
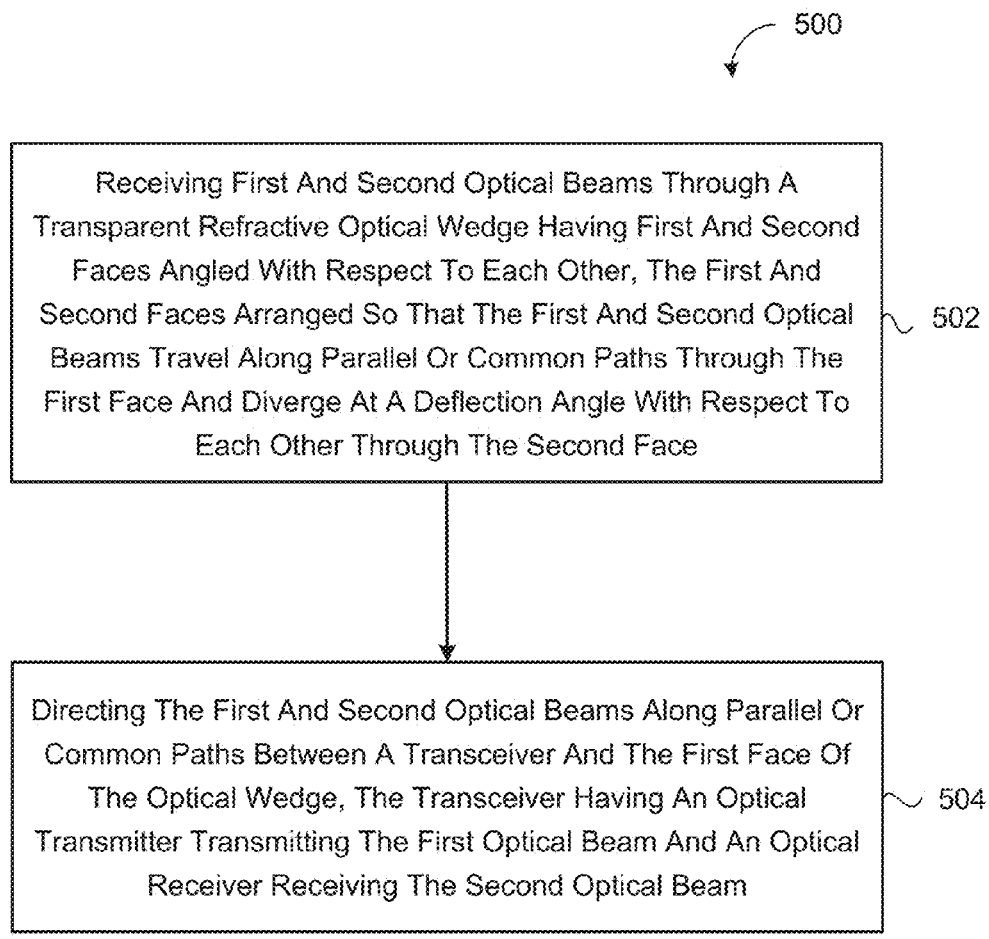
FIG. 5 is a schematic view of an exemplary arrangement of operations of a communication device.

FIG. 5 illustrates a method 500 for communicating. The method 500 includes receiving 502 first and second optical beams B1, B2 through a transparent refractive optical wedge 410 having first and second faces 410a, 410b angled with respect to each other. The first and second faces 410a, 410b are arranged so that the first and second optical beams B1, B2 travel along parallel or common paths through the first face 410a and diverge at a deflection angle with respect to each other through the second face 410b. The method 500 also includes directing 504 the first and second optical beams B1, B2 along parallel or common paths between a transceiver 440 and the first face of the optical wedge 410. The transceiver 440 has an optical transmitter 442 that transmits the first optical beam B1 and an optical receiver 444 that receives the second optical beam B2. In some examples, the optical wedge 410 causes the first optical beam B1 to travel along a first path away from the second face 410b of the optical wedge 410 at the deflection angle with respect to a second path of the second optical beam B2 travelling toward the second face 410b of the optical wedge 410.

The step of directing the first and second optical beams B1, B2 may include transmitting the first optical beam B1 through an optical fiber optically coupled to the transmitter 442 and to a beam splitter 450 in optical communication with the optical fiber. Moreover, directing the first and second optical beams B1, B2 may also include arranging the beam splitter 450 to direct the first optical beam B1 onto a steerable mirror 420 in optical communication with the beam splitter 450 and the first surface 410a of the optical wedge 410 and arranging the steerable mirror 420 to direct the first optical beam B1 onto the first face 410a of the optical wedge 410.

Alternatively, directing the first and second optical beams B1, B2 may include: arranging a steerable mirror 420 to receive the second optical beam B2 through the optical wedge 410 and reflect the second optical beam B2 to a beam splitter 450 in optical communication with the steerable mirror 420; and arranging the beam splitter 450 to split the second optical beam B2 travelling from the steerable mirror 420 to the beam splitter 450 and direct a portion of the split beam to a position feedback device 430 and a remaining portion of the split beam to the transceiver 440. The method 500 may also include arranging the beam splitter 450 to direct the remaining portion of the split beam into an optical fiber optically coupled to the transceiver 440. In some examples, the method 500 includes focusing the portion of the split beam that is travelling from the beam splitter 450 to the position feedback device 430 and/or focusing the portion of the split beam travelling from the beam splitter 450 into an optical fiber optically coupled to the transceiver 440.

In some implementations, directing the first and second optical beams B1, B2 includes: adjusting a position of a steerable mirror 420 in optical communication with the first face of the optical wedge 410 to reflect the second optical beam B2 received through the optical wedge 410 onto a position feedback device 430; and sensing, using the position feedback device 430, an alignment of the reflected second optical beam B2 with the position feedback device 430. Directing the first and second optical beam B1, B2 may also include adjusting the position of the steerable mirror 420 based on the sensed alignment to maintain the alignment of the second optical beam B2 with the position feedback device 430. The position feedback device 430 may include an image sensor, such as a camera.

In some examples, the deflection angle equals between 0 degrees and about 0.1 degrees. The optical wedge 410 may include a fused silica wedge and the first and second faces 410a, 410b are angled with respect to each other by an angle α of between about 12 degrees and about 16 degrees. The optical wedge 410 may have an incidence angle $\delta_{ai}$, $\delta_{bi}$ on both surfaces of up to about 20 degrees. In some examples, the method 500 includes arranging a telescope in optical communication with the optical wedge 410 to focus the beams travelling to and from the second face 410b of the optical wedge 410. The first and second optical beams B1, B2 may have a wavelength separation of about 20 nm. The method 500 may include collimating the optical beams received through optical wedge 410.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation.

Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication system comprising:
   a transparent refractive optical wedge having first and second faces angled with respect to each other for receiving a first optical signal through the optical wedge from the first face to the second face and a second optical signal through the optical wedge from the second face to the first face, the first and second faces arranged so that the first optical signal exiting the second face of the optical wedge diverges at a deflection angle with respect to the second optical signal travelling toward the second face of the optical wedge and the second optical signal exiting the first face of the optical wedge travels along a parallel or common path with respect to the first optical signal traveling toward the first face of the optical wedge;
   a steerable mirror in optical communication with the first face of the optical wedge, the first and second optical signals travelling along the parallel or common path between the steerable mirror and the first face of the optical wedge;
   a position feedback device in optical communication with the steerable mirror, the position feedback device sensing an alignment with the position feedback device of the second optical signal reflecting off of the steerable mirror and adjusting a position of the steerable mirror to maintain the alignment of the reflected second optical signal with the position feedback device; and
   a transceiver in optical communication with the steerable mirror, the transceiver having an optical transmitter transmitting the first optical signal and an optical receiver receiving the second optical signal.

2. The communication system of claim 1, wherein the first and second optical signals travel along a common path between the transceiver and the first face of the optical wedge.

3. The communication system of claim 1, wherein the optical wedge causes the first optical signal exiting the second face of the optical wedge to travel along a first path away from the second face of the optical wedge at the deflection angle with respect to a second path of the second optical signal travelling toward the second face of the optical wedge before the second optical signal passes through the optical wedge.

4. The communication system of claim 1, wherein the deflection angle equals between 0 degrees and about 0.1 degrees.

5. The communication system of claim 1, wherein the optical wedge comprises a fused silica wedge and the first and second faces are angled with respect to each other by an angle of between about 12 degrees and about 16 degrees.

6. The communication system of claim 1, wherein the optical wedge has an incidence angle on both surfaces of up to about 20 degrees.

7. The communication system of claim 1, further comprising a signal splitter in optical communication with the steerable mirror, the position feedback device, and the transceiver, the signal splitter arranged to split one the signals travelling from the steerable mirror to the signal splitter and direct a portion of the split signal to the position feedback device and direct a remaining portion of the split signal to the transceiver.

8. The communication system of claim 7, further comprising an optical lens arranged to focus the portion of the split signal travelling from the signal splitter to the position feedback device.

9. The communication system of claim 7, further comprising an optical lens arranged to focus the optical signals travelling between the signal splitter and the transceiver.

10. The communication system of claim 9, further comprising an optical fiber in optical communication with the transceiver, the optical lens directing the optical signals between a tip of the optical fiber and the signal splitter.

11. The communication system of claim 10, further comprising a wavelength division multiplexer optically coupled to the optical fiber and in optical communication with the transceiver.

12. The communication system of claim 1, further comprising a telescope in optical communication with the optical wedge and arranged to focus the signals travelling to and from the second face of the optical wedge.

13. The communication system of claim 1, wherein the position feedback device comprises an image sensor.

14. The communication system of claim 1, wherein the first and second optical signals have a wavelength separation of about 20 nm.

15. The communication system of claim 1, wherein the optical signals received through optical wedge are collimated.

16. A method comprising:
   receiving first and second optical signals through a transparent refractive optical wedge having first and second faces angled with respect to each other, the first optical signal received through the optical wedge from the first face to the second face and the second optical signal received through the optical wedge from the second face to the first face, the first and second faces arranged so that the first optical signal exiting the second face of the optical wedge diverges at a deflection angle with respect to the second optical signal travelling toward the second face of the optical wedge and the second optical signal exiting the first face of the optical wedge travels along a parallel or common path with respect to the first optical signal traveling toward the first face of the optical wedge; and directing the first and second optical signals along parallel or common paths between a transceiver and the first face of the optical wedge, the transceiver having an optical transmitter transmitting the first optical signal and an optical receiver receiving the second optical signal.

17. The method of claim 16, wherein the optical wedge causes the first optical signal exiting the second face of the optical wedge to travel along a first path away from the second face of the optical wedge at the deflection angle with respect to a second path of the second optical signal travelling toward the second face of the optical wedge before the second optical signal passes through the optical wedge.

18. The method of claim 16, wherein directing the first and second optical signals comprises:
   transmitting the first optical signal through an optical fiber optically coupled to the transmitter and to a signal splitter in optical communication with the optical fiber;
   arranging the signal splitter to direct the first optical signal onto a steerable mirror in optical communication with the signal splitter and the first face of the optical wedge; and
   arranging the steerable mirror to direct the first optical signal onto the first face of the optical wedge.

19. The method of claim 16, wherein directing the first and second optical signals comprises:
   arranging a steerable mirror to receive the second optical signal through the optical wedge and reflect the second optical signal to a signal splitter in optical communication with the steerable mirror; and
   arranging the signal splitter to split the second optical signal travelling from the steerable mirror to the signal splitter and direct a portion of the split signal to a position feedback device and a remaining portion of the split signal to the transceiver.

20. The method of claim 19, further comprising arranging the signal splitter to direct the remaining portion of the split signal into an optical fiber optically coupled to the transceiver.

21. The method of claim 19, further comprising focusing the portion of the split signal travelling from the signal splitter to the position feedback device.

22. The method of claim 19, further comprising focusing the portion of the split signal travelling from the signal splitter into an optical fiber optically coupled to the transceiver.

23. The method of claim 16, wherein directing the first and second optical signals comprises:
   adjusting a position of a steerable mirror in optical communication with the first face of the optical wedge to reflect the second optical signal received through the optical wedge onto a position feedback device;
   sensing, using the position feedback device, an alignment of the reflected second optical signal with the position feedback device; and
   readjusting the position of the steerable mirror based on the sensed alignment to maintain the alignment of the second optical signal with the position feedback device.

24. The method of claim 23, wherein the position feedback device comprises an image sensor.

25. The method of claim 16, wherein the deflection angle equals between 0 degrees and about 0.1 degrees.

26. The method of claim 16, wherein the optical wedge comprises a fused silica wedge and the first and second faces are angled with respect to each other by an angle of between about 12 degrees and about 16 degrees.

27. The method of claim 16, wherein the optical wedge has an incidence angle on both surfaces of up to about 20 degrees.

28. The method of claim 16, further comprising arranging a telescope in optical communication with the optical wedge and to focus the signals travelling to and from the second face of the optical wedge.

29. The method of claim 16, wherein the first and second optical signals have a wavelength separation of about 20 nm.

30. The method of claim 16, further comprising collimating the optical signals received through optical wedge.

* * * * *